(12) United States Patent
Jeong

(10) Patent No.: US 10,406,887 B2
(45) Date of Patent: Sep. 10, 2019

(54) HEATING CONTROL APPARATUS AND METHOD FOR PLUG-IN HYBRID ELECTRIC VEHICLE

(71) Applicants: Hyundai Motor Company, Seoul (KR); Kia Motors Corporation, Seoul (KR)

(72) Inventor: Won Young Jeong, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 260 days.

(21) Appl. No.: 15/355,680

(22) Filed: Nov. 18, 2016

(65) Prior Publication Data

US 2018/0029439 A1 Feb. 1, 2018

(30) Foreign Application Priority Data

Jul. 29, 2016 (KR) .................. 10-2016-0097015

(51) Int. Cl.
| | |
|---|---|
| *B60H 1/00* | (2006.01) |
| *B60W 20/15* | (2016.01) |
| *B60H 1/04* | (2006.01) |
| *B60H 1/14* | (2006.01) |
| *B60W 10/06* | (2006.01) |
| *B60W 10/08* | (2006.01) |
| *B60W 10/30* | (2006.01) |

(52) U.S. Cl.
CPC ..... *B60H 1/00385* (2013.01); *B60H 1/00764* (2013.01); *B60H 1/00878* (2013.01); *B60H 1/04* (2013.01); *B60H 1/143* (2013.01); *B60W 10/06* (2013.01); *B60W 10/08* (2013.01); *B60W 10/30* (2013.01); *B60W 20/15* (2016.01); *B60W 2510/30* (2013.01); *B60W 2550/12* (2013.01); *Y10S 903/93* (2013.01)

(58) Field of Classification Search
None
See application file for complete search history.

(56) References Cited

U.S. PATENT DOCUMENTS

| | | | | |
|---|---|---|---|---|
| 8,774,999 B2* | 7/2014 | Takeda | ................... | B60H 1/004 701/22 |
| 2011/0288701 A1* | 11/2011 | Chen | ..................... | B60H 1/004 701/22 |
| 2014/0116673 A1* | 5/2014 | Kang | ..................... | B60H 1/004 165/222 |

FOREIGN PATENT DOCUMENTS

| | | |
|---|---|---|
| JP | 2016-016711 A | 2/2016 |
| KR | 10-2012-0060112 A | 6/2012 |
| KR | 10-2015-0065409 A | 6/2015 |

* cited by examiner

*Primary Examiner* — David P. Merlino
(74) *Attorney, Agent, or Firm* — Mintz Levin Cohn Ferris Glovsky and Popeo, P.C.; Peter F. Corless

(57) ABSTRACT

A heating control apparatus for a plug-in hybrid electric vehicle utilizing an engine and a drive-motor as power sources includes a temperature detecting device for detecting temperature data used to control indoor heating of the plug-in hybrid electric vehicle, where an indoor temperature of the plug-in hybrid electric vehicle may be increased by generating a ratio of required heat based on the temperature data, generating an engine-on reference value and an engine-off reference value based on the ratio of required heat, and driving the engine based on the engine-on reference value and the engine-off reference value.

10 Claims, 5 Drawing Sheets

400

HEATING CONTROL APPARATUS AND METHOD FOR PLUG-IN HYBRID ELECTRIC VEHICLE

CROSS-REFERENCE TO RELATED APPLICATION

This application claims under 35 U.S.C. § 119(a) the benefit of Korean Patent Application No. 10-2016-0097015 filed in the Korean Intellectual Property Office on Jul. 29, 2016, the entire contents of which are incorporated herein by reference.

BACKGROUND

(a) Technical Field

The present disclosure relates to a heating control apparatus for a plug-in hybrid electric vehicle.

(b) Description of the Related Art

A hybrid vehicle refers to a vehicle utilizing two or more types of power sources in order to drive the vehicle. Such a hybrid vehicle typically utilizes an engine that draws a driving torque by combusting fuel and a drive-motor driven by power of a rechargeable battery.

Recently, a plug-in hybrid electric vehicle (PHEV) has been under development. Such a PHEV has an increased battery capacity in comparison with a conventional hybrid vehicle, and the battery may be charged by an external power source. Such a PHEV is typically driven in an electric vehicle (EV) mode for a short distance, and driven in a hybrid electric vehicle (HEV) mode when the battery is discharged.

That is, such a PHEV includes both an internal combustion engine and a motor in order to drive the vehicle, and includes a high voltage battery of large capacity that may be charged by an external power source.

Conventionally, for such a plug-in hybrid electric vehicle, when heating is requested by a driver with the high voltage battery fully charged, indoor heating is realized by the high voltage battery while running the engine at an idle state.

According to such a conventional scheme, only idling of the engine is utilized upon a heating request of the driver. Therefore, a coolant temperature of the engine rises very slowly, thereby lacking in indoor heating capacity, and driving efficiency and thermal efficiency of the engine is deteriorated since the engine is maintained at an idle state for a long period.

The above information disclosed in this Background section is only for enhancement of understanding of the background of the disclosure and therefore it may contain information that does not form the prior art that is already known in this country to a person of ordinary skill in the art.

SUMMARY

The present disclosure provides a heating control apparatus and method for a plug-in hybrid electric vehicle having an advantage of providing indoor heating depending on a ratio of required heat. In addition, an exemplary embodiment of the present disclosure provides a heating control apparatus and method for a plug-in hybrid electric vehicle having an advantage of enabling a coolant temperature of the engine to reach to a target coolant temperature fast.

A heating control apparatus for a plug-in hybrid electric vehicle according to an exemplary embodiment includes an engine and a drive-motor as power sources, a temperature detecting device for detecting temperature data used to control indoor heating of the plug-in hybrid electric vehicle, and a vehicle controller configured to increase an indoor temperature of the plug-in hybrid electric vehicle by generating a ratio of required heat based on the temperature data, generating an engine-on reference value and an engine-off reference value based on the ratio of required heat, and driving the engine based on the engine-on reference value and the engine-off reference value.

When the ratio of required heat is larger than a predetermined value, the vehicle controller may generate a first engine-on reference value and a first engine-off reference value. When the ratio of required heat is smaller than the predetermined value, the vehicle controller may generate a second engine-on reference value and a second engine-off reference value.

The vehicle controller may generate the first engine-on reference value by using at least one of the ratio of required heat, an EV-on reference value, and a charging-on reference value, and generates the first engine-off reference value by using at least one of the ratio of required heat, an EV-off reference value, and a charging-off reference value.

The vehicle controller may generate the second engine-on reference value by using at least one of the ratio of required heat, the EV-on reference value, and an HEV-on reference value, and generates the second engine-off reference value by using at least one of the ratio of required heat, the EV-off reference value, and an HEV-off reference value.

The vehicle controller may generate the ratio of required heat by using a measured coolant temperature, an outdoor temperature, and a target coolant temperature of the temperature data.

The vehicle controller may generate the ratio of required heat by using at least one of an indoor volume, a blower capacity, a target indoor temperature, a measured coolant temperature, an outdoor temperature, and a measured indoor temperature.

The vehicle controller may perform determining whether a vehicle mode is an EV mode based on a state of charge (SOC) of a battery, determining whether a cooling and heating system is turned on and a target indoor temperature is greater than an outdoor temperature, when the vehicle mode is the EV mode, and generating the ratio of required heat with respect to heating capability of required heat based on the temperature data when the cooling and heating system is turned on and the target indoor temperature is greater than the outdoor temperature.

A heating control method for a plug-in hybrid electric vehicle according to an exemplary embodiment includes: determining, by a vehicle controller, whether temperature data satisfies a heating condition when a vehicle mode is an EV mode; generating, by the vehicle controller, a ratio of required heat based on the temperature data when the temperature data satisfies the heating condition; generating, by the vehicle controller, an engine-on reference value and an engine-off reference value based on the ratio of required heat; and driving, by the vehicle controller, an engine based on the engine-on reference value and the engine-off reference value so as to increase an indoor temperature of the vehicle.

According to a heating control apparatus for a plug-in hybrid electric vehicle of an exemplary embodiment, indoor heating of a vehicle is realized by driving an engine based on the ratio of required heat, and thereby driving efficiency and fuel consumption of the engine may be improved.

Since the engine is driven until the coolant temperature reaches a target coolant temperature, rapid heating may be achieved by a rapid increase of the coolant temperature.

Further, effects that can be obtained or expected from exemplary embodiments of the present disclosure are directly or suggestively described in the following detailed description. That is, various effects expected from exemplary embodiments of the present disclosure will be described in the following detailed description.

DETAILED DESCRIPTION OF THE EMBODIMENTS

Figure 1:
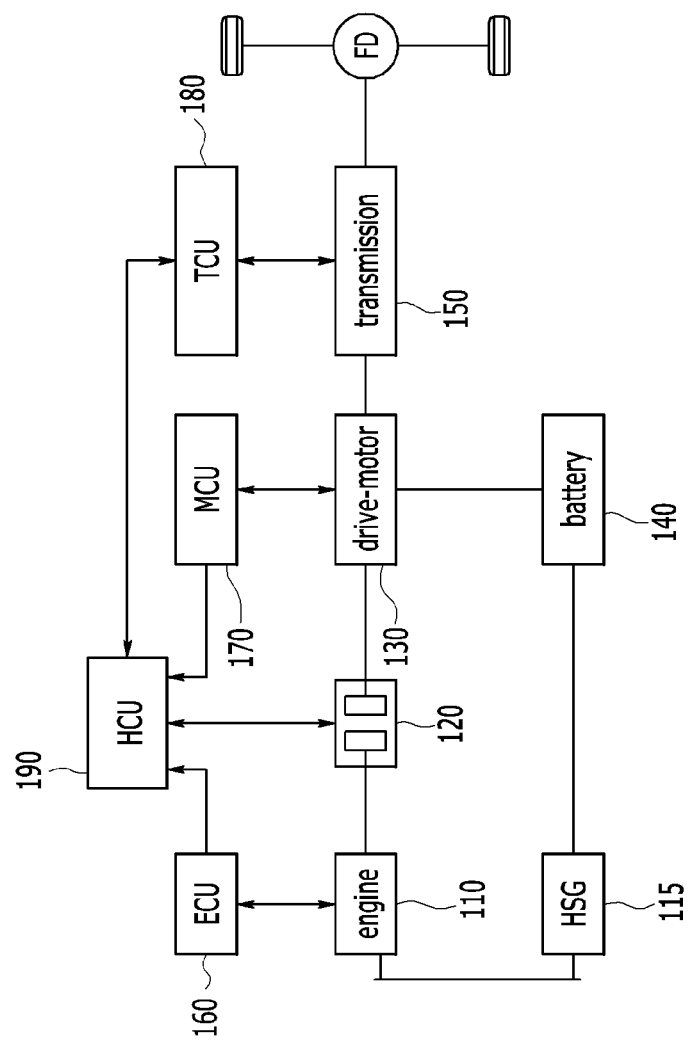
FIG. 1 is a schematic view of a plug-in hybrid electric vehicle with a heating control apparatus according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The present disclosure will be described more fully hereinafter with reference to the accompanying drawings, in which exemplary embodiments of the disclosure are shown. However, the drawings to be described below and the following detailed description relate to one preferred exemplary embodiment of various exemplary embodiments for effectively explaining the characteristics of the present disclosure. Therefore, the present disclosure should not be construed as being limited to the drawings and the following description.

Hereinafter, exemplary embodiments of the present disclosure will be described in detail with reference to the accompanying drawings.

FIG. 1 illustrates a plug-in hybrid electric vehicle with a heating control apparatus according to an exemplary embodiment of the present disclosure.

Referring to FIG. 1, a plug-in hybrid electric vehicle with a heating control apparatus according to an exemplary embodiment of the present disclosure includes an engine 110, a hybrid integrated starter-generator (HSG) 115, an engine clutch 120, a drive-motor 130, a battery 140, a transmission 150, an engine controller (ECU) 160, a motor controller (MCU) 170, a transmission controller (TCU) 180, and a vehicle controller (e.g., a hybrid control unit, or HCU) 190.

The engine 110 generates power by combustion of fuel. The engine 110 may be of various types of known engines, such as a gasoline engine or a diesel engine.

A running of the engine 110 is controlled by the ECU 160, and the ECU 160 may control the engine 110 at an optimal driving condition.

The HSG 115 may start the engine 110, or act as a generator so as to generate an electrical energy when the engine 110 is running.

The engine clutch 120 is disposed between the engine 110 and the drive-motor 130, and controls a power transmission between the engine 110 and the drive-motor 130 under the control of the HCU 190. The engine clutch 120 connects or disconnects the engine 110 and the drive-motor 130 depending on whether the vehicle is driven in an electric vehicle (EV) mode or hybrid electric vehicle (HEV) mode.

When engine clutch 120 is released, the hybrid vehicle is driven only by the drive-motor 130. When the engine clutch 120 is operated (engaged), the vehicle may be driven by the torque of the engine 110, or by the torques of the engine 110 and the drive-motor 130 in combination.

The drive-motor 130 is driven by a 3-phase AC voltage applied by the MCU 170, and generates a driving torque. In a situation of coasting or regenerative braking of the vehicle, the drive-motor 130 may also act as an electric generator so as to supply an electric power to the battery 140.

The battery 140 is formed as a plurality of unit cells, and stores high voltage electricity to be supplied to the drive-motor 130 as a driving voltage. The battery 140 supplies the driving voltage to the drive-motor 130 in the EV mode and the HEV mode, and is recharged by electricity generated by the drive-motor 130 and the HSG 115 at regenerative braking.

The battery 140 may also be recharged by a recharging device when an external electric power source is plugged-in.

The transmission 150 controls speed ratios under the control of the TCU 180, and transmits a torque received from the drive-motor 130, to which the torque of the engine 110 may have been added when the engine clutch 120 is operated, to drive-wheels so as to drive the hybrid vehicle.

The ECU 160 is networked with the HCU 190, and controls an overall operation of the engine 110 based on a driver-requested torque signal, a coolant temperature, an engine speed, a throttle valve opening, an intake amount, an engine torque, and etc. The ECU 160 provides a status of the engine 110 to the HCU 190.

The MCU 170 controls, under the control of the HCU 190, driving and output torque of the drive-motor 130, and enables the drive-motor 130 to generate electricity at regenerative braking so as to store the generated electricity to the battery 140.

Based on signals from the ECU 160 and the MCU 170, the TCU 180 controls an overall operation of the transmission 150, such as determining an appropriate speed ratio, an amount of generated electricity at the regenerative braking, and etc. The TCU 180 provides a status of the transmission 150 to the HCU 190.

The HCU 190 is a top tier controller that controls an overall operation of the hybrid vehicle such as determining the driving modes. The HCU 190 gathers information from subsidiary controllers networked with the HCU 190, and controls the subsidiary controllers, e.g., to control output torques of the output engine 110 and the drive-motor 130.

Figure 2:
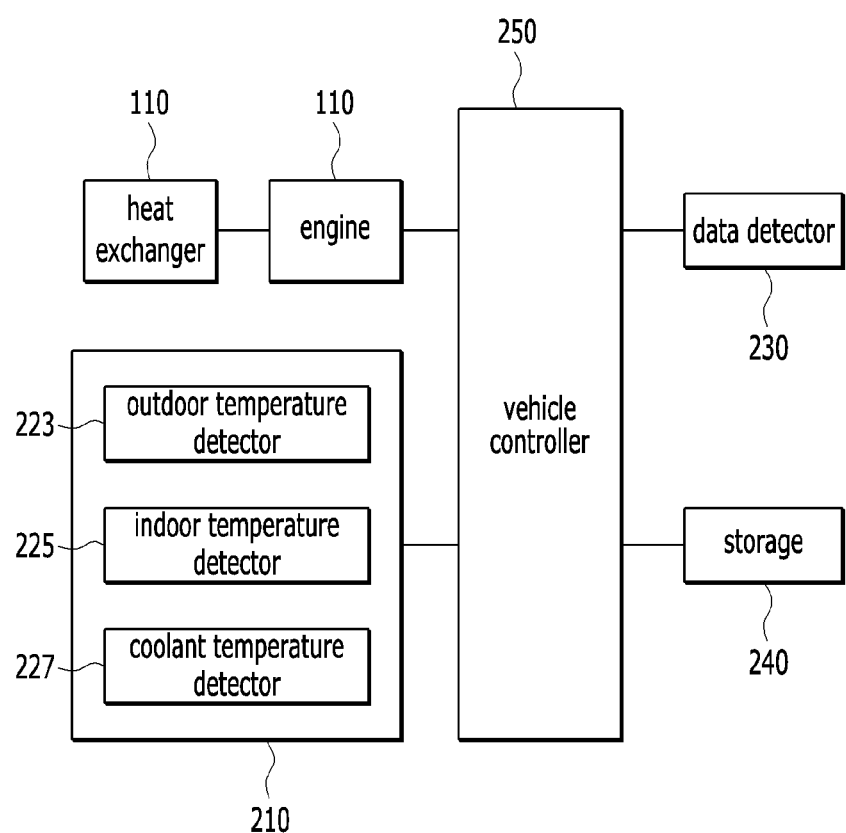
FIG. 2 is a schematic view of a heating control apparatus for a plug-in hybrid electric vehicle according to an exemplary embodiment of the present disclosure.

FIG. 2 illustrates a heating control apparatus for a plug-in hybrid electric vehicle according to an exemplary embodiment of the present disclosure. One or more of the ECU 160, the MCU 170, and the HCU 190 may partially execute processes of a heating control method for a plug-in hybrid electric vehicle according to an exemplary embodiment of the present disclosure that is later described in detail. Therefore, the ECU 160, the MCU 170, and the HCU 190 are collectively referred to as a vehicle controller 200.

Referring to FIG. 2, a heating control apparatus for a plug-in hybrid electric vehicle includes a heat exchanger 100, an engine 110, a temperature detecting device 210, a data detector 230, a storage 240, and a vehicle controller 250.

A coolant for cooling the engine 10 circulates through the heat exchanger 100. The heat exchanger 100 receives a heated coolant from the engine 110, and performs an indoor heating by heating air supplied from exterior by the heated coolant.

The engine 110 heats the coolant when operated by the vehicle controller 250, and the heated coolant is supplied to the heat exchanger 100.

The temperature detecting device 210 detects temperature data used for controlling indoor heating of the plug-in hybrid electric vehicle, and supplies the detected temperature data to the vehicle controller 250.

The temperature detecting device 210 includes an outdoor temperature detector 223, an indoor temperature detector 225, and a coolant temperature detector 227.

The outdoor temperature detector 223 measures an outdoor temperature of the plug-in hybrid electric vehicle, and supplies the measured outdoor temperature to the vehicle controller 250.

The indoor temperature detector 225 measures an indoor temperature of the plug-in hybrid electric vehicle, and supplies the measured indoor temperature to the vehicle controller 250.

The coolant temperature detector 227 measures a temperature of the coolant, and supplies the measured coolant temperature to the vehicle controller 250.

The data detector 230 detects status data of the plug-in hybrid electric vehicle, and supplies the detected status data to the vehicle controller 250. The status data may include an SOC of the battery, a vehicle speed, an accelerator pedal position value, a brake pedal position value, and etc.

The storage 240 stores data generated by and required at constituent elements of a heating control apparatus according to an exemplary embodiment.

For example, the storage 240 may store the temperature data detected by the temperature detecting device 210, and also store the status data detected by the data detector 230.

The storage 240 may store a ratio of required heat, engine-on reference value, and engine-off reference value produced by the vehicle controller 250. The storage 240 may also store predetermined on and off reference values for respective vehicle modes.

In addition, the storage 240 may provide required data to the temperature detecting device 210, the data detector 230, and the vehicle controller 250 under a request.

The storage 240 may also store instructions of software for controlling overall operation of a heating control apparatus.

The storage 240 may be an integrated memory, or include a plurality of memories. The storage 240 may be a read only memory (ROM), a random access memory (RAM), and a flash memory.

The vehicle controller 250 controls constituent elements of the heating control apparatus, i.e., the heat exchanger 100, the engine 110, the temperature detecting device 210, the data detector 230, and the storage 240.

In an EV mode, the vehicle controller 250 determines whether the status data satisfies a heating condition. When the status data satisfies the heating condition, the vehicle controller 250 generates a ratio of required heat based on the temperature data. The ratio of required heat means a ratio of required heat with respect to a heating capability.

The vehicle controller 250 generates an engine-on reference value and an engine-off reference value based on the ratio of required heat.

The vehicle controller 250 operates the engine based on the engine-on reference value and the engine-off reference value, and thereby increases an indoor temperature of the hybrid vehicle. In particular, when a driver-requested power is larger than the engine-on reference value, the vehicle controller 250 turns on the engine 110, and when the driver-requested power is smaller than the engine-off reference value, the vehicle controller 250 turns off the engine 110.

A method for controlling heating of a plug-in hybrid electric vehicle according to an embodiment of the present disclosure is hereinafter described in detail with reference to FIGS. 3-5.

Figure 3:
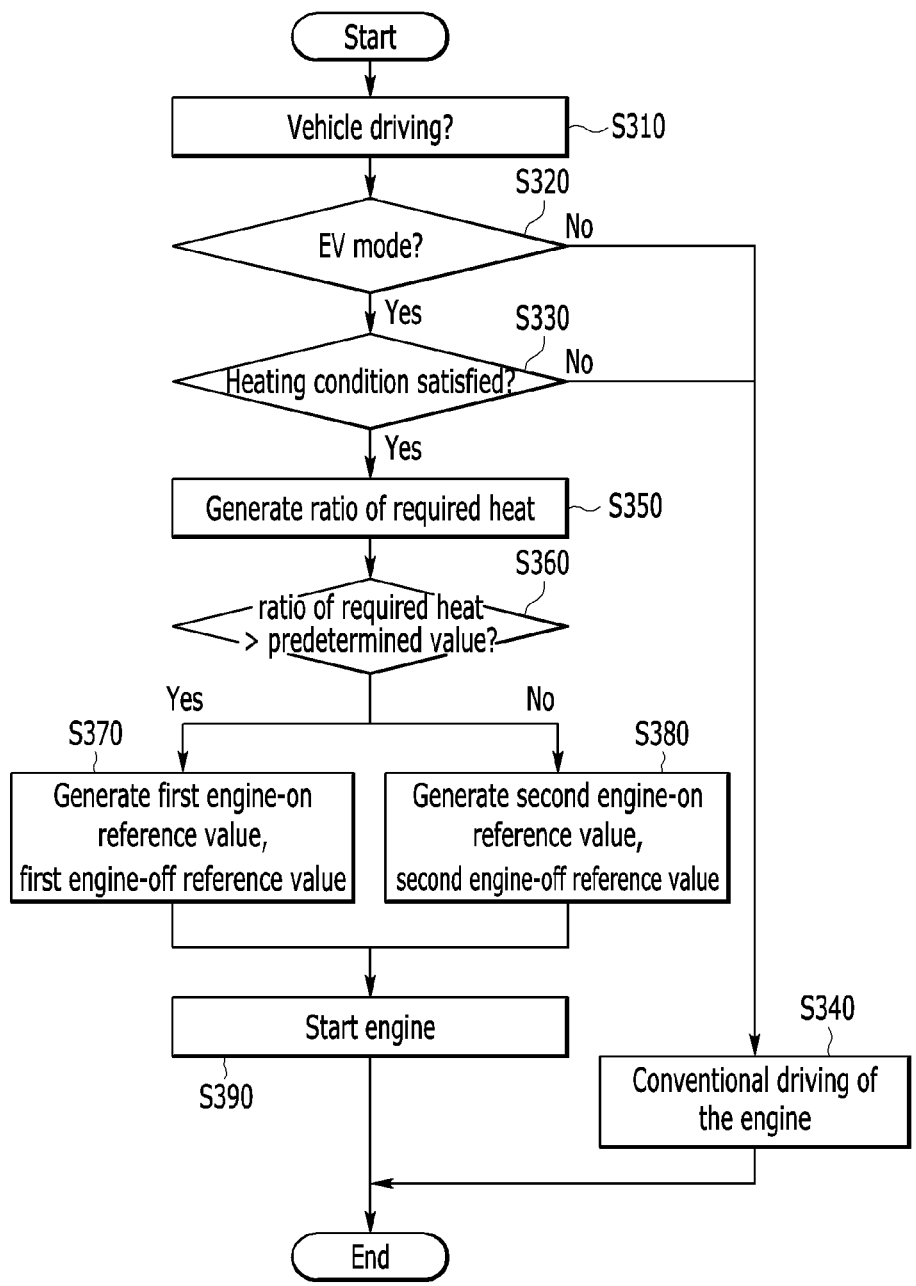
FIG. 3 is a flowchart of a heating control method for a plug-in hybrid electric vehicle according to an exemplary embodiment of the present disclosure.
Figure 4:
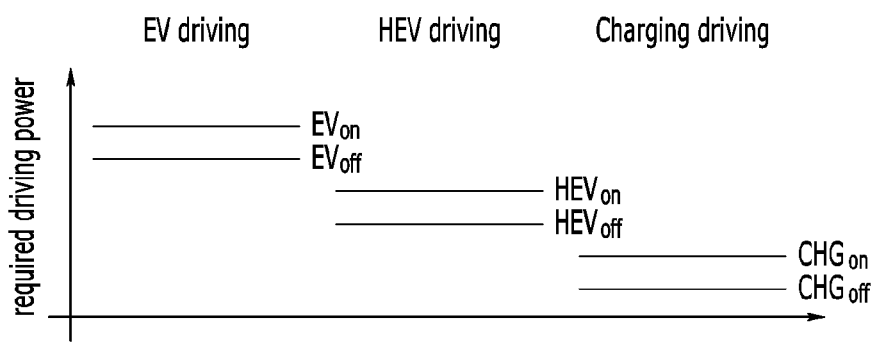
FIG. 4 is a graph illustrating examples of on and off reference values of respective vehicle modes according to an exemplary embodiment of the present disclosure.
Figure 5:
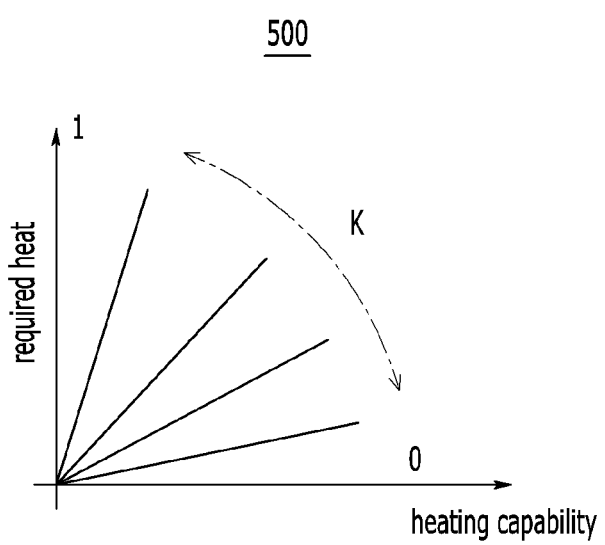
FIG. 5 is a graph illustrating a ratio of required heat according to an exemplary embodiment of the present disclosure.

FIG. 3 illustrates a heating control method for a plug-in hybrid electric vehicle according to an exemplary embodiment of the present disclosure, FIG. 4 illustrates examples of on and off reference values of respective vehicle modes according to an exemplary embodiment of the present disclosure, and FIG. 5 illustrates a ratio of required heat according to an exemplary embodiment of the present disclosure.

Referring to FIG. 3, at step S310, the vehicle controller 250 drives the vehicle by operating at least one of the engine and the drive-motor when requested by the driver.

At step S320, the vehicle controller 250 determines whether a vehicle mode is an EV mode. In particular, the vehicle controller 250 determines whether the vehicle mode is the EV mode among the EV mode, an HEV mode, and a charging mode, based on a battery SOC in status data.

Then, at step S330, the vehicle controller 250 determines whether temperature data satisfies a heating condition. At step S330, the vehicle controller 250 may determine whether a power switch of a cooling and heating system (not shown) of the vehicle is turned on by the driver. When the power switch of the cooling and heating system is turned on, the vehicle controller 250 determines whether a target indoor temperature is greater than or equal to an outdoor temperature of the temperature data. Here, the target indoor temperature may mean an indoor temperature of the vehicle requested by the driver.

When the vehicle mode is other than the EV mode or the temperature data does not satisfy the heating condition, the vehicle controller 250 provides an indoor heating by driving the engine according to a conventional scheme at step S340. For example, the vehicle controller 250 may refer to a reference table 400 including an engine-on reference value and an engine-off reference value preset with respect to respective vehicle modes, e.g., as shown in FIG. 4. Such a reference table may be preset through a predetermined algorithm (e.g., program and probability model).

As shown in FIG. 4, when the vehicle mode is the HEV mode, the vehicle controller 250 may drive the engine 110 based on an HEV-on reference value (HEVon) and an HEV-off reference value (HEVoff) preset for the HEV mode.

When the temperature data satisfies the heating condition, the vehicle controller 250 generates the ratio of required heat based on the temperature data, at step S350. In particular, the vehicle controller 250 generates the ratio of required heat 500 indicating a ratio of required heat with respect to heating capability, as shown in FIG. 5. The ratio of required heat may be between 0 and 1.

The vehicle controller 250 generates the ratio of required heat based on the target coolant temperature, the measured coolant temperature, and the outdoor temperature. The vehicle controller 250 may generate the ratio of required heat based on the [Equation 1] shown below.

$$K = \frac{CTm - OT}{CTg - OT} \quad \text{[Equation 1]}$$

Here, K is the ratio of required heat, CTm is the measured coolant temperature, OT is the outdoor temperature, and CTg is the target coolant temperature. The target coolant temperature may be set depending on a target indoor temperature requested by the driver.

In addition, the vehicle controller 250 may generate the ratio of required heat by using at least one of an indoor volume, a blower capacity, the target indoor temperature, the measured coolant temperature, the outdoor temperature, and the measured indoor temperature. For example, the vehicle controller 250 may generate the ratio of required heat based on the [Equation 2] shown below.

$$K = \frac{CTm - OT}{ITm + \frac{V}{F} * (ITg - ITm) - OT} \quad \text{[Equation 2]}$$

Here, K is the ratio of required heat, CTm is the measured coolant temperature, OT is the outdoor temperature, ITm is the measured indoor temperature, V is the indoor volume, F is the blower capacity, and ITg is the target indoor temperature. Here, the indoor volume means a volume of the vehicle interior, and may be different vehicle by vehicle. The blower capacity may be determined based on a stage of the blower requested by the driver.

Then, at step S360, the vehicle controller 250 determines whether the ratio of required heat is larger than a predetermined value. Here, the predetermined value is a reference value to determine whether a high speed heating is required. For example, the predetermined value may be preset to 0.5.

When the ratio of required heat is larger than the predetermined value, the vehicle controller 250 generates a first engine-on reference value and a first engine-off reference value at step S370. When the ratio of required heat is larger than the predetermined value, which satisfies a high heating condition, and the vehicle controller 250 generates the first engine-on reference value by using at least one of the ratio of required heat, the EV-on reference value and a charging-on reference value.

For example, the vehicle controller 250 may generate the first engine-on reference value according to [Equation 3] shown below.

$$EV1_{on} = (EV_{on} - CHG_{on}) * K + CHG_{on} \quad \text{[Equation 3]}$$

Here, EV1on is the first engine-on reference value, EVon is the EV-on reference value, CHGon is the charging-on reference value, and K is the ratio of required heat. Referring to FIG. 4, the EV-on reference value to a reference value to turn on the engine 110 in the EV mode, and the charging-on reference value may refer to a reference value to turn on the engine 110 in the charging mode. The EV-on reference value and the charging-on reference value may be predetermined values.

The vehicle controller 250 generates the first engine-off reference value by using at least one of the ratio of required heat, the EV-off reference value, and a charging-off reference value.

The vehicle controller 250 may generate the first engine-off reference value according to [Equation 4] shown below.

$$EV1_{off} = (EV_{off} - CHG_{off}) * K + CHG_{off} \quad \text{[Equation 4]}$$

Here, EV1off is the first engine-off reference value, EVoff is the EV-off reference value, CHGoff is the charging-off reference value, and K is the ratio of required heat. Referring to FIG. 4, the EV-off reference value may refer to a reference value for turning off the engine 110 in the EV mode, and the charging-off reference value may refer to a reference value for turning off the engine 110 in the charging mode. The EV-off reference value and the charging-off reference value may be predetermined values.

When the ratio of required heat is smaller than the predetermined value, the vehicle controller 250 generates a second engine-on reference value and a second engine-off reference value at step S380.

When the ratio of required heat is smaller than the predetermined value, which satisfies a normal heating condition, and the vehicle controller 250 generates the second engine-on reference value by using at least one of the ratio of required heat, the EV-on reference value, and the charging-on reference value.

The vehicle controller 250 may generate the second engine-on reference value according to [Equation 5] shown below.

$$EV2_{on} = (EV_{on} - HEV_{on}) * K + HEV_{on} \quad \text{[Equation 5]}$$

Here, EV2on is the second engine-on reference value, EVon is the EV-on reference value, HEVon is the HEV-on reference value, and K is the ratio of required heat. Referring to FIG. 4, the HEV-on reference value may refer to a reference value to turn on the engine 110 in the HEV mode, and may be a predetermined value.

The vehicle controller 250 generates the second engine-off reference value by using at least one of the ratio of required heat, the EV-off reference value, and the HEV-off reference value.

The vehicle controller 250 may generate the second engine-off reference value according to [Equation 6] shown below $$EV2_{off}=(EV_{off}-HEV_{off})*K+HEV_{off} \quad \text{[Equation 6]}$$

Here, EV2off is the second engine-off reference value, EVoff is the EV-off reference value, HEVoff is the HEV-off reference value, and K is the ratio of required heat. Referring to FIG. 4, the HEV-off reference value may refer to a reference value for turning off the engine 110 in the HEV mode, and may be a predetermined value.

At step S390, the vehicle controller 250 drives the engine 110 based on the engine-on reference value and the engine-off reference value, and thereby increases the indoor temperature. In particular, when a required driving power is larger than the engine-on reference value, the vehicle controller 250 turns on the engine 110, and when the required driving power is smaller than the engine-off reference value, the vehicle controller 250 turns off the engine 110. The required driving power refers to a driving power requested by the driver, and may be generated based on the status data, such as a vehicle speed, an accelerator pedal position value, a brake pedal position value, etc.

As described above, according to a heating control apparatus for a plug-in hybrid electric vehicle of an exemplary embodiment, an engine-on reference value and an engine-off reference value are generated based on the ratio of required heat, and the engine 110 is driven based on the generated engine-on reference value and the engine-off reference value to increase the indoor temperature. According to a heating control apparatus for a plug-in hybrid electric vehicle according to an exemplary embodiment of the present disclosure, the engine 110 is not merely maintained at an idle state, and is driven based on the ratio of the required heat to provide indoor heating, thereby improving driving efficiency, thermal efficiency, and fuel consumption.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A heating control method for a plug-in hybrid electric vehicle, comprising:
   determining, by a vehicle controller, whether temperature data satisfies a heating condition when a vehicle mode is an EV mode;
   generating, by the vehicle controller, a ratio of required heat with respect to heating capacity based on the temperature data when the temperature data satisfies the heating condition;
   generating, by the vehicle controller, an engine-on reference value and an engine-off reference value based on the ratio of required heat; and
   driving, by the vehicle controller, an engine based on the engine-on reference value and the engine-off reference value so as to increase an indoor temperature of the vehicle,
   wherein the ratio of required heat is generated by using a measured coolant temperature, an outdoor temperature, and a target coolant temperature of the temperature data, and wherein the ratio of required heat is generated according to an equation of $$K = \frac{CTm - OT}{CTg - OT},$$

where K is the ratio of required heat, CTm is the measured coolant temperature, OT is the outdoor temperature, and CTg is the target coolant temperature.

2. The heating control method of claim 1, wherein the generating of the engine-on reference value and the engine-off reference value comprises:
   determining, by the vehicle controller, whether the ratio of required heat is larger than a predetermined value; and
   generating, by the vehicle controller, a first engine-on reference value and a first engine-off reference value when the ratio of required heat is larger than a predetermined value.

3. The heating control method of claim 2, wherein the generation of the first engine-on reference value and first engine-off reference value comprises:
   generating, by the vehicle controller, the first engine-on reference value by using at least one of the ratio of required heat, an EV-on reference value, and a charging-on reference value; and
   generating, by the vehicle controller, the first engine-off reference value by using at least one of the ratio of required heat, an EV-off reference value, and a charging-off reference value.

4. The heating control method of claim 3, wherein the first engine-on reference value is generated according to an equation of $EV1_{on}=(EV_{on}-CHG_{on})*K+CHG_{on}$,
   where EV1on is the first engine-on reference value, EVon is the EV-on reference value, CHGon is the charging-on reference value, and K is the ratio of required heat.

5. The heating control method of claim 3, wherein the first engine-off reference value is generated according to an equation of $EV1_{on}=(EV_{on}-CHG_{on})*K+CHG_{on}$,
   where EV1off is the first engine-off reference value, EVoff is the EV-off reference value, CHGoff is a charging-off reference value, and K is the ratio of required heat.

6. The heating control method of claim 2, further comprising:
   generating, by the vehicle controller, a second engine-on reference value and a second engine-off reference value when the ratio of required heat is smaller than the predetermined value.

7. The heating control method of claim 6, wherein the generation of the second engine-on reference value and second engine-off reference value comprises:
   generating, by the vehicle controller, the second engine-on reference value by using at least one of the ratio of required heat, an HEV-on reference value, and a charging-on reference value; and
   generating, by the vehicle controller, the second engine-off reference value by using at least one of the ratio of required heat, an HEV-off reference value, and a charging-off reference value.

8. The heating control method of claim 7, wherein the second engine-on reference value is generated according to an equation of $EV2_{on}=(EV_{on}-HEV_{on})*K+HEV_{on}$,
where EV2on is the second engine-on reference value, EVon is the EV-on reference value, HEVon is the HEV-on reference value, and K is the ratio of required heat.

9. The heating control method of claim 7, wherein the second engine-off reference value is generated according to an equation of $EV2_{on}=(EV_{on}-HEV_{on})*K+HEV_{on}$,
where EV2off is the second engine-off reference value, EVoff is the EV-off reference value, HEVoff is the HEV-off reference value, and K is the ratio of required heat.

10. A heating control method for a plug-in hybrid electric vehicle, comprising:
    determining, by a vehicle controller, whether temperature data satisfies a heating condition when a vehicle mode is an EV mode;
    generating, by the vehicle controller, a ratio of required heat with respect to heating capacity based on the temperature data when the temperature data satisfies the heating condition;
    generating, by the vehicle controller, an engine-on reference value and an engine-off reference value based on the ratio of required heat; and
    driving, by the vehicle controller, an engine based on the engine-on reference value and the engine-off reference value so as to increase an indoor temperature of the vehicle,
    wherein the ratio of required heat is generated by using at least one of an indoor volume, a blower capacity, a target indoor temperature, a measured coolant temperature, an outdoor temperature, and a measured indoor temperature, and
    wherein the ratio of required heat is generated according to an equation of $$K = \frac{CTm - OT}{ITm + \frac{V}{F}*(ITg - ITm) - OT},$$

where K is the ratio of required heat, CTm is the measured coolant temperature, OT is the outdoor temperature, ITm is the measured indoor temperature, V is the indoor volume, F is the blower capacity, and ITg is the target indoor temperature.

* * * * *